United States Patent

[11] 3,621,193

| [72] | Inventors | George M. Low<br>Deputy Administrator of the National Aeronautics and Space Administration with respect to an invention of;<br>Robert D. Banta, Merritt, Fla. |
|---|---|---|
| [21] | Appl. No. | 73,834 |
| [22] | Filed | Sept. 21, 1970 |
| [45] | Patented | Nov. 16, 1971 |

[54] POSITIVE CONTACT RESISTANCE SOLDERING UNIT
2 Claims, 1 Drawing Fig.

[52] U.S. Cl. .................................................. 219/234,
219/85, 219/109, 324/65 R
[51] Int. Cl. .................................................. B23k 3/04,
H05b 3/00
[50] Field of Search .......................................... 219/221,
227–241, 85, 86, 90, 108–110; 73/94; 324/65 R

[56] References Cited
UNITED STATES PATENTS

| 1,975,997 | 10/1934 | Whitesell ..................... | 219/109 |
| 2,577,515 | 12/1951 | Durst ........................... | 219/234 |
| 2,790,059 | 4/1957 | Burnett ........................ | 219/234 X |
| 2,996,604 | 8/1961 | Lemson et al. ............... | 219/110 |
| 3,140,383 | 7/1964 | Bauer ........................... | 219/110 |
| 3,149,221 | 9/1964 | Watter et al. ................. | 219/110 |

Primary Examiner—A. Bartis
Attorneys—James O. Harrell and John R. Manning

ABSTRACT: A positive contact resistance soldering unit which has a relay therein, which is operated by a foot switch for selectively coupling a milliohmeter to the electrodes for measuring the resistance between the electrodes and the workpiece in order to determine the best contact therebetween. When the milliohmmeter indicates that the electrodes are in good contact with the workpiece the foot switch is depressed connecting the output of a power transformer to the electrodes to begin the soldering operation.

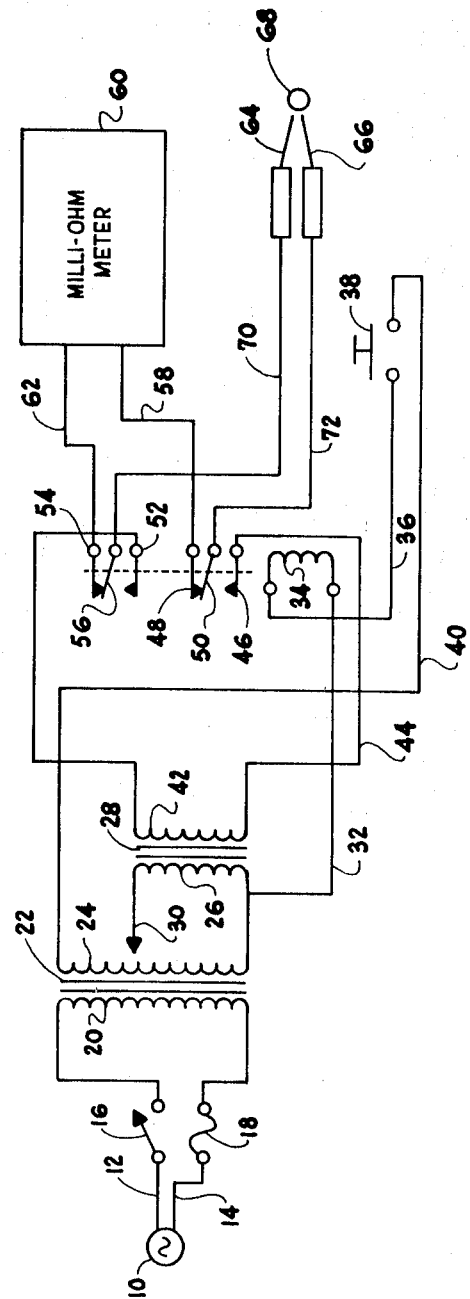

POSITIVE CONTACT RESISTANCE SOLDERING UNIT

The invention described herein was made in performance of work under a NASA Contract, and is subject to the provisions of Section 305 of the National Aeronautics and Space Act of 1968, Public Law 85-568 (72 Stat. 435, 402 U.S.C.P. 2457).

The invention relates to a soldering unit, and more particularly to a soldering unit wherein positive contact between the electrodes and workpiece is insured.

When soldering is attempted using resistance soldering equipment, there must be good contact between the soldering electrodes and the workpiece. If there is poor contact, arcing between the electrodes and workpiece will cause damage thereto and possibly require replacement of the workpiece. It is especially important when soldering expensive equipment which cannot be readily replaced, such as the components of space vehicles, that a good contact is insured between the electrodes and the workpiece prior to beginning the soldering operation.

In accordance with the present invention, it has been found that difficulties encountered in conventional soldering units may be overcome by providing a novel positive contact resistance soldering unit. This positive contact resistance soldering unit includes the following basic parts: (1) a source of power, (2) a stepdown transformer having a primary and a secondary winding, (3) a relay having a control coil electrically coupled to the source of power, (4) a foot switch connected in series with the coil for selectively opening and closing the electrical connection between the secondary winding of the stepdown transformer and the coil, (5) a milliohmmeter, (6) relay contacts operated by the control coil for being shifted between a first position and a second position responsive to opening and closing of the foot switch, (7) means for connecting the milliohmmeter to the soldering electrodes for measuring the resistance between the electrodes and the workpiece for insuring good contact therebetween when the contacts are in the first position, and (8) means for connecting the secondary winding of the transformer to the electrodes for carrying out the soldering operation responsive to the contacts being shifted to the second position.

Accordingly, it is an important object of the present invention to provide a positive contact soldering unit which insures a good connection between the electrodes and the workpiece prior to the soldering operation commencing.

Another important object of the present invention is to provide a new and novel positive contact resistance soldering unit wherein arcing between the electrodes and the workpiece is minimized.

Other objects and advantages of this invention will become more apparent from a reading of the following detailed description and appended claims, taken in conjunction with the accompanying drawing wherein:

The FIGURE is a schematic electrical diagram of the positive contact resistance soldering unit.

Referring in more detail to the drawing, a schematic diagram of the positive contact resistance soldering unit is illustrated, and is connected to any suitable source of AC voltage 10, such as 115 volts. The AC source 10 is connected through leads 12 and 14 by means of switch 16 and fuse 18 to a primary winding 20 of a variable autotransformer 22. This variable autotransformer is frequently referred to as a powerstat. A secondary winding 24 of the transformer 22 has one side connected to the primary winding 26 of a stepdown transformer 28. The other side of the primary winding 26 is coupled to an adjustable contact 30 which can be moved along the secondary winding 24 of transformer 22. The secondary winding 24 is also coupled through lead 32 to one side of a control coil 34 of a relay. The other side of the control coil 34 is coupled to lead 36 to a foot-operated switch 38 which, when depressed, energizes the relay coil 34. The other side of the foot-operated switch 38 is coupled through lead 40 to the other side of the secondary winding 24.

Connected to one side of a secondary winding 42 of the stepdown transformer by means of lead 44 is a terminal 46 forming a part of a double pole relay. Spaced from terminal 46 is a mating terminal 48 between which is carried a movable contact 50 which is shifted responsive to the relay coil 34 being energized. Another set of relay contact terminals 52 and 54 are provided with a movable contact 56 located therebetween. Relay contact 48 is connected by lead 58 to a milliohm indicator or meter 60. The other contact 54 of the set is connected by lead 62 to the milliohm meter.

The two soldering electrodes 64 and 66 which are used to solder on a workpiece 68 are each connected to a movable contact. Electrode 64 is connected through lead 70 to movable contact 56, while electrode 66 is connected through lead 72 to movable contact 50.

In operation, when the foot switch 38 is open relay coil 34 is deenergized, therefore, the double-pole double-throw high-current relay switch is in the position illustrated in the FIGURE and, the ohmmeter 60 reads the resistance between electrodes 64 and 66. When there is maximum contact between the electrodes 64 and 66 and the workpiece 68, the ohmmeter 60 will indicate a minimum resistance. When this is established, the foot switch 38 is depressed energizing relay coil 34 causing the movable contacts 50 and 56 to move downwardly wherein the electrodes 64 and 66 are connected directly to the secondary winding 42 of the stepdown transformer allowing the operator to solder on the workpiece. Experience will indicate the maximum resistance acceptable to get a quality soldering joint on the workpiece.

I claim:

1. A positive contact resistance soldering unit for insuring a good contact between a pair of soldering electrodes and a workpiece comprising:
   A. a source of power,
   B. a stepdown transformer having a primary and a secondary winding,
   C. a relay having a control coil electrically coupled to said source of power,
   D. a foot switch connected in series with said coil for selectively opening and closing the electrical connection between said secondary winding of said secondary winding of said stepdown transformer and said coil,
   E. a milliohmmeter,
   F. relay contacts operated by said control coil for being shifted between a first position and second position responsive to opening and closing of said foot switch,
   G. means for connecting said milliohmmeter to said soldering electrodes for measuring the resistance between said electrodes and said workpiece for insuring good contact therebetween, when said contacts are in said first position, and
   H. means for connecting said secondary winding of said transformer to said electrodes for carrying out the soldering operation responsive to said contacts being shifted to said second position.

2. The soldering unit as set forth in claim 1, wherein said source of power comprises:
   A. an AC voltage source,
   B. a powerstat having a primary and secondary winding,
   C. said relay coil being selectively coupled through said foot switch to said secondary winding of said powerstat, and
   D. said primary winding of said stepdown transformer being connected to said secondary winding of said powerstat.

* * * * *